United States Patent [19]

Mimura et al.

[11] Patent Number: 5,051,583

[45] Date of Patent: Sep. 24, 1991

[54] ATMOSPHERIC PRESSURE IONIZATION TYPE MASS SPECTROMETER

[75] Inventors: Tadao Mimura; Fumihiko Nakajima, both of Katsuta, Japan

[73] Assignee: Hitachi, Ltd., Tokyo, Japan

[21] Appl. No.: 589,592

[22] Filed: Sep. 27, 1990

[30] Foreign Application Priority Data

Sep. 29, 1989 [JP] Japan ................................ 1-251924

[51] Int. Cl.[5] ........................ B01D 59/44; H01J 49/30

[52] U.S. Cl. .................................... 250/288; 250/281; 250/252.1

[58] Field of Search .................. 250/281, 288, 288 A, 250/423 R, 252.1

[56] References Cited

U.S. PATENT DOCUMENTS

| | | | |
|---|---|---|---|
| 4,144,451 | 3/1979 | Kambara | 250/281 |
| 4,209,696 | 6/1980 | Fite | 250/281 |
| 4,403,147 | 9/1983 | Melera et al. | 250/281 |
| 4,546,253 | 10/1985 | Tsuchiya et al. | 250/423 R |
| 4,769,540 | 9/1988 | Mitsui et al. | 250/281 |
| 4,849,628 | 7/1989 | McLuckey et al. | 250/288 |
| 4,861,988 | 8/1989 | Henion et al. | 250/281 |
| 4,935,624 | 6/1990 | Henion et al. | 250/282 |

FOREIGN PATENT DOCUMENTS 1182305 4/1976 Japan .

OTHER PUBLICATIONS

"Application of High-Performance Liquid Chromatography/Atmospheric Pressure Ionization Mass Spectrometry for the Analysis of Non-Volatile Compounds", Kato et al., *BioMedical and Environmental Mass Spectrometry*, vol. 16, pp. 331-334, 1988.

*Primary Examiner*—Bruce C. Anderson
*Attorney, Agent, or Firm*—Antonelli, Terry, Stout & Kraus

[57] ABSTRACT

An atmospheric pressure ionization type mass spectrometer comprises an ionization section opened to the atmosphere including a desolvation chamber, an ionization chamber, and a corona discharge needle for ionizing sample, a mass analysis section including a mass spectrometry, an intermediate pressure section in which cluster ions of the sample are accelerated by a drift voltage from the ionization section towards the mass analysis section. In advance of the mass spectroscopy, the moisture in the atmosphere is ionized into the water cluster ions. Such water cluster ions are used for calibrating a mass marker of the mass spectrometry.

3 Claims, 3 Drawing Sheets

ATMOSPHERIC PRESSURE IONIZATION TYPE MASS SPECTROMETER

FIELD OF THE INVENTION AND RELATED ART STATEMENT

The present invention relates to an atmospheric pressure ionization type mass spectrometer.

Generally, in the mass spectroscopy, when a mass spectrum is observed, correct mass should be obtained from such mass spectrum. Accordingly, a mass marker is provided in the mass spectrometer for such purpose. The mass of the observed mass spectrum can be determined by reading out the mass marker.

However, the mass marker cannot always represent the correct values. Therefore, it is needed to conduct the correction of the mass marker or the mass calibration in advance of mass spectroscopy.

The mass calibration is usually conducted by means of using a reference sample whose mass of mass spectrum has been already known. The mass spectrum of the reference sample is observed by the mass spectrometer and then the mass marker is so calibrated as to make an error between the mass obtained and the known mass of such reference sample become zero.

However, a range of mass of a single reference sample is limited. Therefore, it is needed to vary the reference sample according to the sample to be measured, and in case of the sample to be measured with a wide range of mass, it is also needed to use some kinds of reference samples in order to conduct mass calibration.

OBJECT AND SUMMARY OF THE INVENTION

An object of the present invention is to provide a mass spectrometer capable of conducting the mass calibration along a wide range of mass without usage of the specific reference sample.

Further, another object of the present invention is to provide a mass spectrometer capable of conducting the fine mass calibration.

To this end, according to the present invention, the mass calibration can be conducted by using cluster ions of water in the atmosphere as a reference sample.

The functions and the meritorious advantages of the present invention will become more clear from the following explanation of the preferred embodiment described with referring to the accompanying drawings.

DETAILED DESCRIPTION OF PREFERRED EMBODIMENTS

Figure 1:
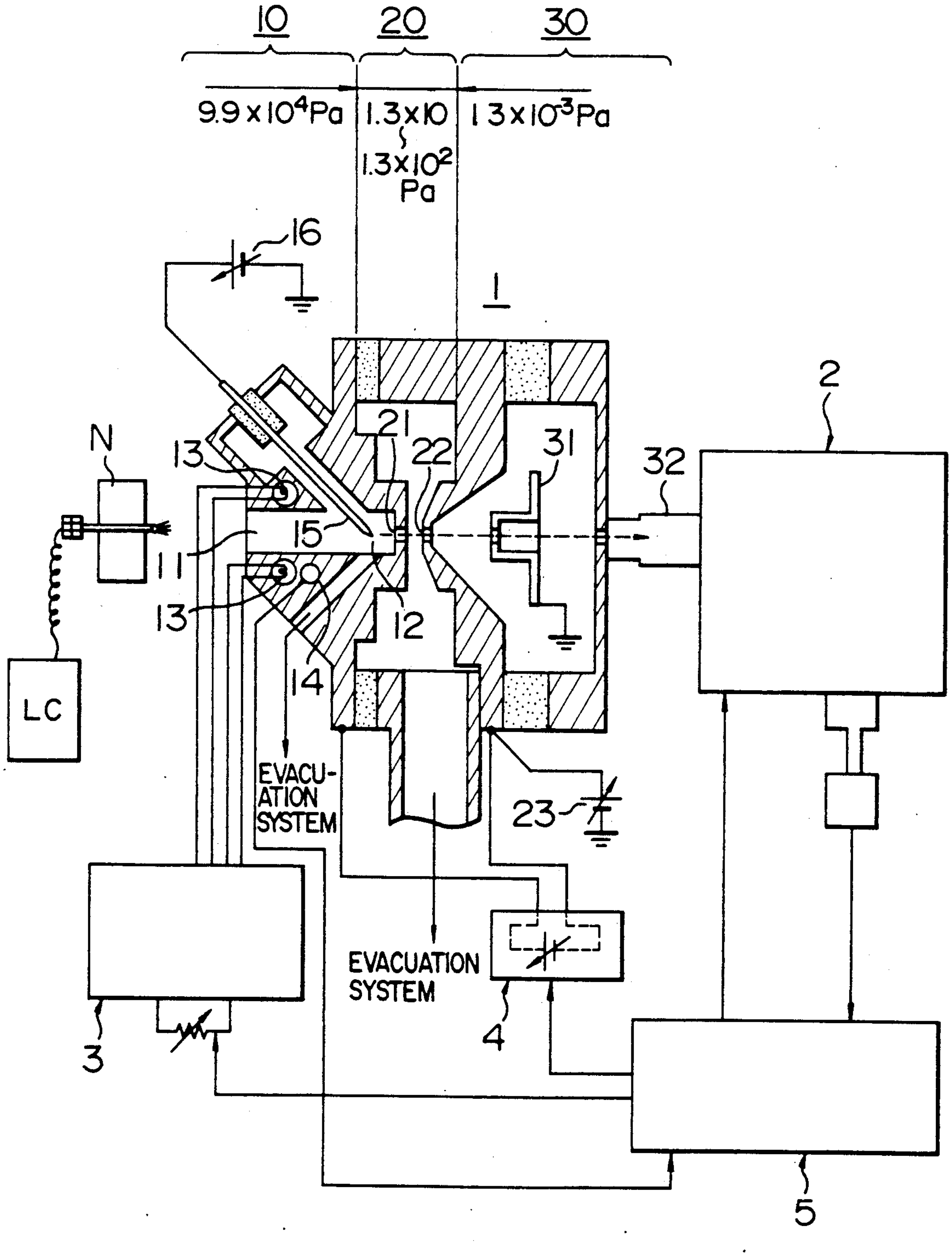
FIG. 1 is a block diagram showing an arrangement of an atmospheric pressure ionization type mass spectrometer to which an embodiment of the present invention is applied.

Referring to FIG. 1, an atmospheric pressure ionization type mass spectrometer according to one embodiment of the present invention cooperates with a liquid chromatography LC to conduct a mass spectroscopy of the sample.

The atmospheric pressure ionization type mass spectrometer comprises an interface 1 including an ionization section 10, an intermediate pressure section 20 and analyzing section 30, a mass spectrometry 2, a heater power source 3, a drift power source 4 and a data processing/controlling unit 5 for controlling these elements.

The ionization section 10 is opened to the atmosphere ($9.9\times10^4$ Pa) and is provided with a desolvation chamber 11 and an ionization chamber 12 communicated with the desolvation chamber 11. The desolvation chamber 11 is provided with heaters 13 for heating an interior thereof and with a thermometer 14 for detecting a temperature of the interior of the desolvation chamber 11. A corona discharge needle 15 extends into the ionization chamber 12, which is connected to a power source 16 of 5–10 Kv.

The analyzing section 30 is provided with an electrostatic lens 31 through which ions of the sample pass towards the mass spectrometry 2. The analyzing section 30 and a communication section 32 between the analyzing section 30 and the mass spectrometry 2 are kept air-tightly and in a low pressure level not more than $1.3\times10^3$ Pa.

The intermediate pressure section 20 between the ionization section 10 and the analyzing section 30 is connected to a vacuum pump or a cryo-pump to evacuate the intermediate pressure section 20, thereby maintaining the interior thereof in an intermediate pressure level about $1.3\times10^1$—about $1.3\times10^2$ Pa.

The ionization section 10 and the analyzing section 30 are communicated via the intermediate pressure section 20 with each other through a pair of microbore electrodes 21 and 22 which are aligned with each other. A power source 23 applies an ion acceleration voltage of about 3 to about 4 Kv between the electrodes 21 and 22.

An operation of the above-mentioned mass spectrometer will be described hereinunder.

First a mobile phase and a sample effluent from the liquid chromatography LC flow into a nebulizer N through a polytetrafluoroethylene pipe. The mobile phase and the sample are heated in the nebulizer N to be nebulized, and flow into the ionization section 10. In the desolvation chamber 11 of the ionization section 10, the nebulized mobile phase and sample are vapourized into molecular ones.

The mobile phase and sample molecules are ionized in the ionization chamber 12 by means of the corona discharge of the needle 15. The ionized mobile phase molecules conduct a molecular reaction with the sample molecules, and then protons are transferred from the ionized mobile phase molecules to unionized sample molecules to ionize them. The ionized sample molecules are accelerated by the ion acceleration voltage through the electrodes 21 and 22, and flow into the mass spectrometry 2 through the analyzing section 30 and then analyzed therein. At the moment, when a drift voltage is applied between the electrodes 21 and 22, the ionized sample molecules and mobile phase molecules are accelerated to collide against neutral particles. Since the mobile phase molecule has a weak bonding strength, as compared with the ionized sample molecules, the ionized mobile phase molecules collide against neutral particles to collapse. This prevents the mobile phase molecules from flowing into the analyzing section 30, thereby improving the analytic performance.

In the ionization chamber 12, the moisture in the atmosphere may be ionized to generate water cluster ions simultaneously. The mass spectrometry 2 receives water cluster ions as noise, which deteriorates the analytic performance.

Accordingly, as disclosed in Japanese Patent No. 1182305, it is conventional that the interior of the desolvation chamber 11 is heated upto about 400 degrees by the heaters 13 connected to the heater power source 3 to make the water cluster ions readily collapsible. The drift voltage is subsequently applied to the collapsible water cluster ions so as to collide against neutral particles to collapse. According this, a higher analytic performance can be obtained.

According to the present invention, the water cluster ions which are formerly eliminated in advance of analyzing operation re used for mass calibration. According to the present invention, the temperature in the interior of the desolvation chamber 11 is maintained in a predetermined level not more than 400 degrees, thereby making water cluster ions become uncollapsible to some extent. The drift voltage is applied to collapse the specific water cluster ions so as to obtain a reference mass spectrum having a desired mass range. The drift voltage is varied to change water cluster ions to be collapsed, thereby obtaining the reference mass spectrum having different mass range. Such operation is repeated to obtain the reference mass spectrum of a wide mass range from a low mass, e.g. 19 to a high mass, e.g. 991.

In case of low temperature in the desolvation chamber 11, the water cluster ions can be hard to collapse. Therefore, even though a higher drift voltage is applied, an appropriate reference mass spectrum cannot be obtained. To the contrary, in case that the temperature in the desolvation chamber 11 is higher than 150 degrees, the water cluster ions are readily collapsible and then even though a lower drift voltage is applied, a reference mass spectrum of higher mass cannot be obtained. Accordingly, in order to obtain a reference mass spectrum, namely on the mass calibration, the temperature in the interior of the desolvation chamber 11 must be kept in a calibration level temperature which is from the room temperature to 150 degrees.

Figure 2:
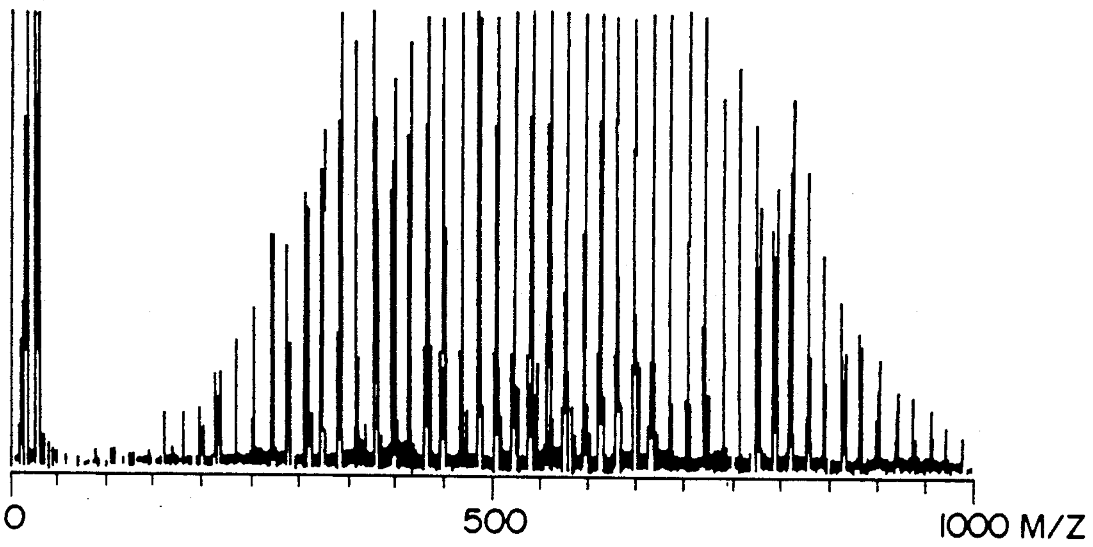
FIG. 2 is a graph showing a partial mass spectrum of water cluster ions when a drift voltage of 100 V is applied.
Figure 3:
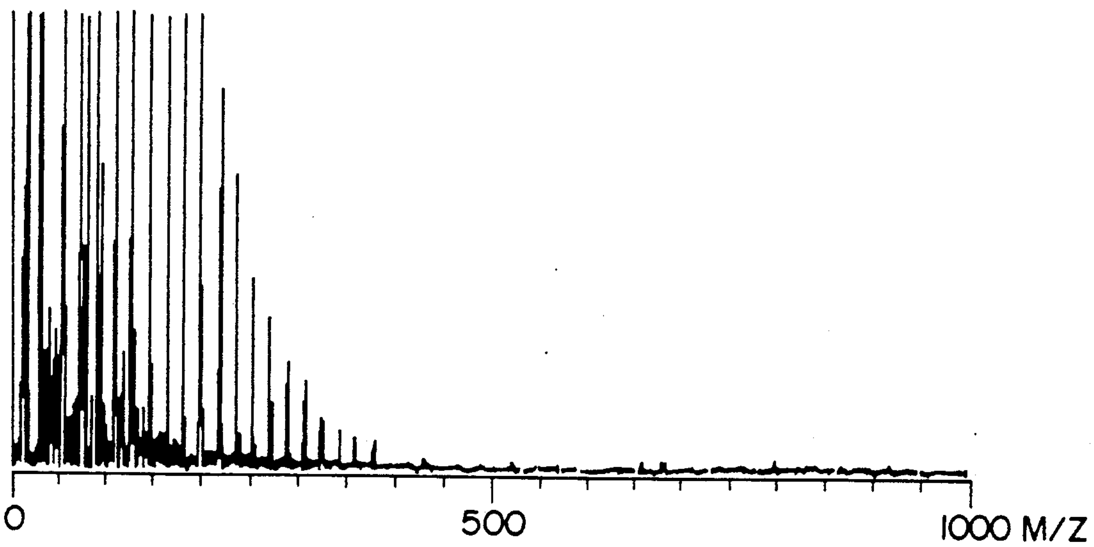
FIG. 3 is a graph showing a partial mass spectrum of water cluster ions when a drift voltage of 250 V is applied.
Figure 4:
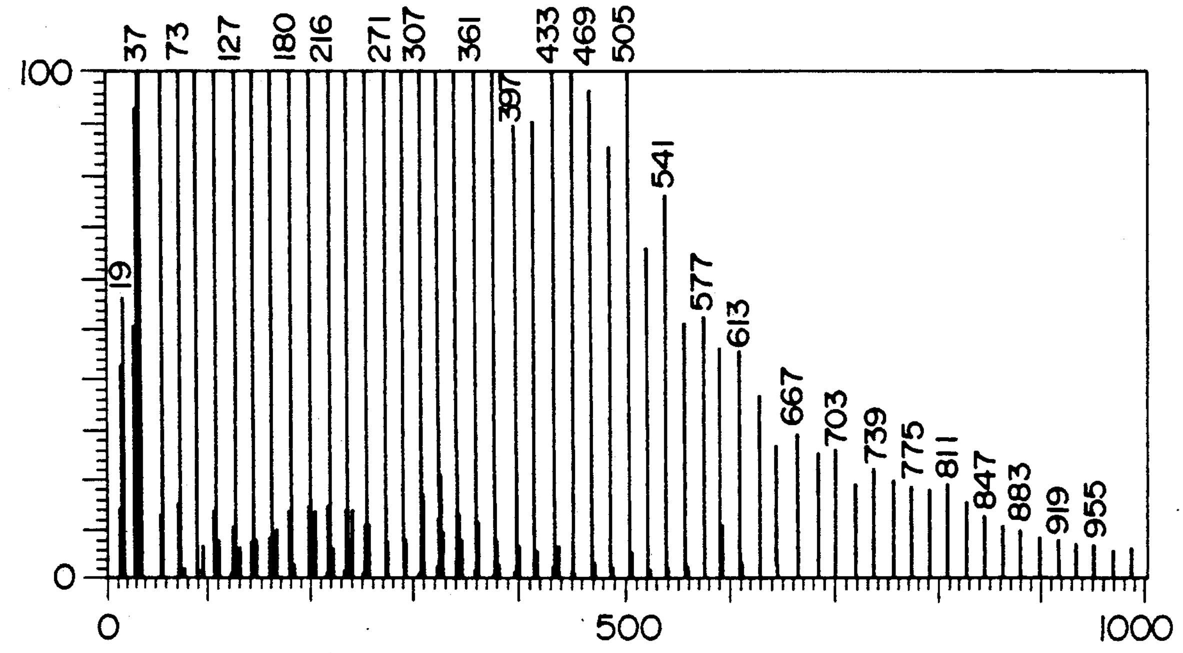
FIG. 4 is a graph showing a whole mass spectrum of water cluster ions used for the mass calibration.

In this embodiment, the temperature in the interior of the desolvation chamber 11 is held in the predetermined calibration temperature, and each time the drift voltage is changed from 100 V to 200 V by 10 V or 20 V, a partial reference mass spectrum can be obtained by the mass spectrometry 2. For example, when a drift voltage of 100 V is applied, as shown in FIG. 2, a partial mass spectrum of mass from 200 to 1000 can be obtained. To the contrary, when a drift voltage of 250 V is applied, as shown in FIG. 3, another partial mass spectrum of mass from 19 to 350 can be obtained. The partial mass spectra which are obtained each time the drift voltage is changed are sequentially stored in the data processing-/controlling unit 5 and then synthesized to obtain a whole reference mass spectrum of water cluster ions as shown in FIG. 4, whose mass is from 19 to about 1000.

At first, observed is the mass spectrum of the water cluster ion whose mass is 19(=M+H) (M represents a molecular weight and H represents a proton), and also observed is the mass spectra of the water cluster ions whose mass m satisfies the following equations;

$$m=18n+19$$

where n represents a natural number. Namely, mass spectrum is observed each mass 18.

In case of the prior art using a known reference sample, e.g. polyethylene glycol 400, only obtained is a mass spectrum includes the mass from 250 to 700. In another case of polyethylene glycol 600, a mass spectrum includes the mass from 400 to 1000 can only obtained. It is difficult for a single specific known reference sample to cover a wide range of the mass, e.g. from 19 to 1000. Further, according to the prior art, the mass spectrum is observed each mass 44. Accordingly, as compared with water cluster ions, it isn't possible to carry out a fine mass calibration.

According to the above-mentioned embodiment, when the desolvation chamber is heated from the room temperature to the rated temperature (400 degrees) for mass spectroscopy, the moment that the temperature in the interior of the desolvation chamber is in the predetermined calibration temperature, the above-mentioned operations can be carried out, thereby conducting the mass calibration without interrupting mass spectroscopy operation.

As apparent from the above-mentioned, according to the present invention, since moisture in the atmosphere is used instead of the specific reference sample, the mass calibration can be readily and simply carried out with fine accuracy.

What is claimed is:

1. An atmospheric pressure ionization type mass spectrometer comprising:

- an ionization section opened to the atmosphere, said ionization section including a desolvation chamber and an ionization chamber;
- means provided in said ionization section for ionizing sample to be measured in said ionization chamber;
- means for heating an interior of said desolvation chamber;
- a mass analysis section including a mass spectrometry, in which mass spectrum of said sample is measured;
- an intermediate pressure section through which cluster ions of said sample pass from said ionizing chamber towards said mass analysis section;
- means for calibrating a mass marker of said mass spectrometry by means of using water cluster ions;
- means for accelerating said cluster ions in said intermediate pressure section;
- means for controlling said heating means and said accelerating means so as to adjust a temperature in said desolvation chamber and an acceleration of said cluster ions.

2. An atmospheric pressure ionization type mass spectrometer according to claim 1, wherein said water cluster ions are ions produced by ionizing the water molecules contained in the atmosphere.

3. An atmospheric pressure ionization type mass spectrometer according to claim 1, wherein said acceleration is conducted by a drift voltage applied between said ionization section and said mass analysis section, and said controlling means include a controller for adjusting said drift voltage.

* * * * *